United States Patent [19]
Combs, III

[11] Patent Number: 5,152,095
[45] Date of Patent: Oct. 6, 1992

[54] ADJUSTABLE FISHING LINE RELEASE

[76] Inventor: Milton E. Combs, III, 2149 Coral Gardens Dr., Ft. Lauderdale, Fla. 33306

[21] Appl. No.: 599,474

[22] Filed: Oct. 18, 1990

[51] Int. Cl.⁵ .............................................. A01K 91/00
[52] U.S. Cl. ..................................... 43/43.12; 81/319
[58] Field of Search ................ 43/43.12; 81/328, 325, 81/324, 320, 319, 314, 313

[56] References Cited

U.S. PATENT DOCUMENTS

| | | | |
|---|---|---|---|
| 1,052,982 | 2/1913 | Weinzierl | 81/319 |
| 1,106,518 | 8/1914 | Matti | |
| 2,605,568 | 8/1952 | Riley | 43/43.12 |
| 2,749,649 | 6/1956 | Fitzisimmons | 43/43.12 |
| 2,958,973 | 11/1960 | May | 43/43.12 |
| 3,026,646 | 3/1962 | Weaver | 43/43.12 |
| 3,357,126 | 12/1967 | Klieves | 43/43.12 |
| 3,766,681 | 10/1973 | Mander | 43/43.12 |
| 4,538,373 | 9/1985 | Rogers | 43/43.12 |
| 4,565,026 | 1/1986 | Bohme | 43/43.12 |
| 4,698,933 | 10/1987 | Shaw | 43/43.12 |
| 4,722,339 | 2/1988 | Dreier et al. | 81/319 |
| 4,825,583 | 5/1989 | Kammeraad | 43/43.12 |
| 4,957,020 | 9/1990 | Monceret | 81/414 |

Primary Examiner—Kurt Rowan
Assistant Examiner—Chuck Y. Mah

[57] ABSTRACT

A fishing line release of the friction gripping jaw type having free ends with friction pads affixed to one end and an adjustable ratchet type tension control positioned at the other, where an interlocking shaft is focused between said ends resulting in a fulcrum type mechanism producing jaw tension.

6 Claims, 1 Drawing Sheet

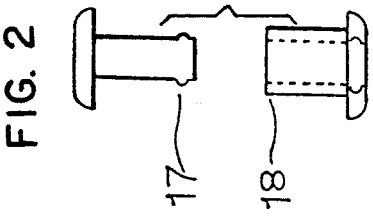
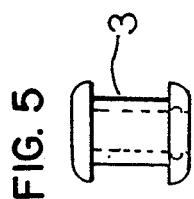
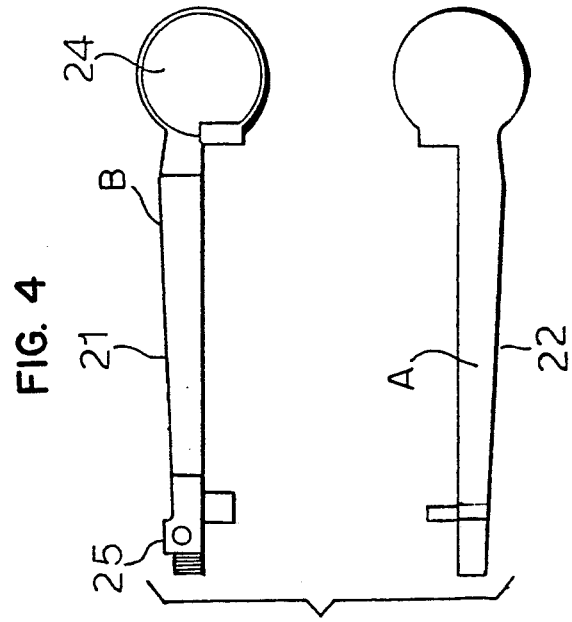
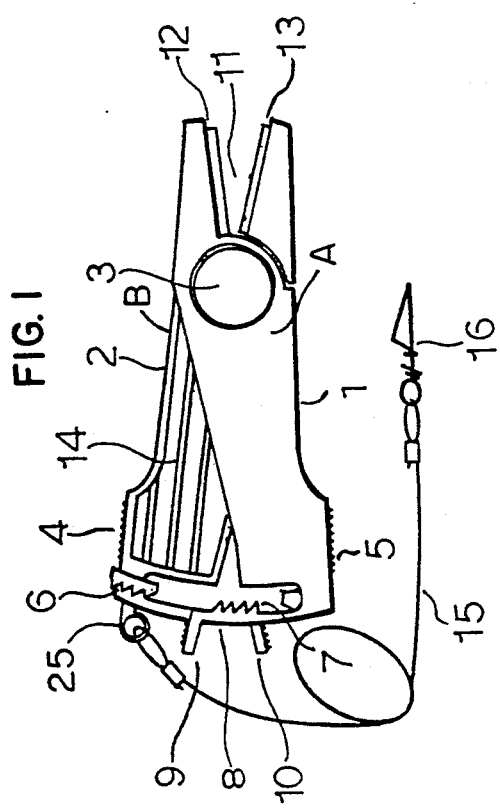
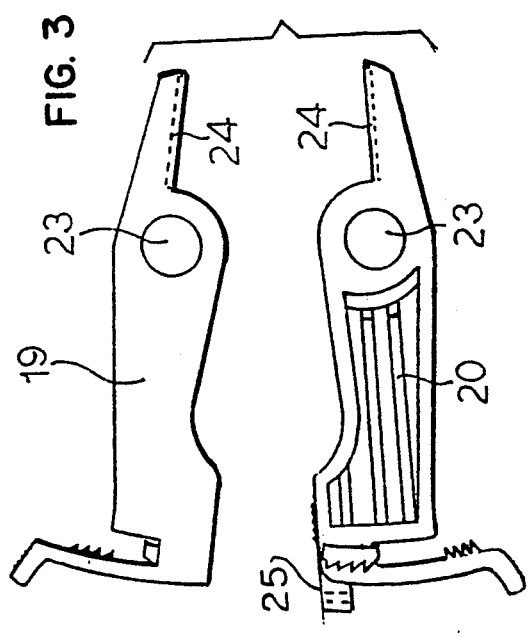

ADJUSTABLE FISHING LINE RELEASE

BACKGROUND

1. Field of Invention

This invention relates to fishing line release devices commonly used to place a fishing bait in desired remote locations relative to a fishing boat. These devices are used to affix the fishing line to downrigger balls below the water's surface or to outriggers which hold the line out and away from the fishing boat.

2. Descriotion of Prior Art

A fishing line release device which can be used with both downriggers and outriggers, holds the fishing line in place without chafing, offers simple adjustable tension control, performs in both salt and fresh water fishing applications, has no corrosive parts holds the fishing line in place via friction gripping jaws and can be operated easily with one hand would be preferred by most fishermen.

Heretofore a variety of line release devices have been proposed. Typical release devices are seen in the U.S. patents of Shaw, U.S. Pat. No. 4,698,933; Mander, U.S. Pat. No. 3,766,681; Klieves, U.S. Pat. No. 3,357,126; Weaver, U.S. Pat. No. 3,026,646; May, U.S. Pat. No. 2,958,973; Fitzsimmons, U.S. Pat. No. 2,749,649; and Riley, U.S. Pat. No. 2,605,568. An additional devise which does not currently have U.S. patent numbers has been proposed by S/K Products, PO Box 0630, Muskegon, MI 49443-0630 and sold under the product name Universal Release.

The friction gripping jaw type release clip typically produces chafing on the fishing line when pulled free from the release jaws, resulting in line breaks and reduced line stress capacity. Many of these jaw type release devices have little or no jaw tension adjustment limiting their range of fishing applications. This type of release device uses spring and other corrosive devices subject to damage by marine environments to achieve jaw tension. The jaw type release is normally biased toward a closed position with the tension producing spring eventually losing its mechanical ability.

One friction gripping jaw type release by Shaw, U.S. Pat. No. 4,698,933 requires the use of multiple springs to achieve a range of jaw tension. As spring capacity increases the devise becomes increasingly difficult to manually operate the jaws. This limited range of line holding ability requires a different spring combination for varied fishing applications.

Another friction gripping jaw type release, manufactured by S/K Products, uses a ratchet device located at opposite ends of the gripping jaws and an oblique rotating shaft assembly holding two parallel arms in close proximity to vary jaw tension. This type of multiple tension control system produces a complicated two stage tension adjustment, requiring two distinct operations to vary jaw tension and a separate tool such as a coin or screwdriver inserted into the shaft receptacles by which to rotate the oblique shaft.

OBJECTS AND ADVANTAGES

Accordingly we claim the following as our objects and advantages of the invention: to provide a friction gripping jaw type line release which holds a fishing line firmly in place utilizing a simply operated fully adjustable jaw tension control system.

In addition we claim a further object and advantage: to provide a line release device which due to its fully adjustable tension control mechanism may be used in a wide range of fishing applications for both fresh and salt water species.

In addition we claim a further object and advantage: to provide a ratchet type tension adjustment system which allows wide variation in jaw pressure from one location on the invention.

In addition we claim a further object and advantage: to provide a tension control system by which both jaw compression and release may be achieved via the same directional movement of both the tension producing and the tension release mechanism.

In addition we claim a further object and advantage: to provide a ratchet controlled tension producing device utilizing two parallel levers which will release the inventions jaw tension by lightly compressing two salient finger tip devices.

In addition we claim a further object and advantage: to provide a two part interlocking shaft assembly permanently holding the inventions main body assembly together, assuring close parallel proximity of said main body parts, resulting in sustained mechanical advantage of the invention's line gripping jaws.

In addition we claim a further object and advantage: to provide a leader securing device so the invention may be tethered to a downrigger or outrigger, through which a cable may be passed in parallel alignment to the line release levers assuring clear and unencumbered operation of said levers.

In addition we claim a further object and advantage: to provide parallel longitudinal supports traversing between the shaft and ratchet providing support and rigidity to the compression arms.

DRAWINGS FIGURES

FIG. 1 Shows a side view of the invention.

FIG. 2 shows a disassembled top view of the interlocking shaft assembly.

FIG. 3 shows a disassembled side view of the invention without shaft assembly.

FIG. 4 shows a disassembled top view of the invention without shaft assembly.

FIG. 5 shows an assembled top view of the shaft.

DRAWING REFERENCE NUMERALS

1—Compression arm A
2—Compression arm B
3—Interlocking shaft
4—Tension engaging surface of arm B
5—Tension engaging surface of arm A
6—Ratchet receptor teeth
7—Ratchet arm teeth
8—Ratchet lever arm
9—Salient tension release arm A
10—Salient tension release arm B
11—Jaws
12—Jaw pad A
13—Jaw pad B
14—Parallel ribs
15—Tether line
16—Tether hook
17—Ribbed interlocking shaft
18—Receptor interlocking shaft
19—Compression arm outside view
20—Compression arm inside view
21—Left compression arm
22—Right compression arm 23—Interlocking shaft hole
24—Circular pad depression
25—Tether line anchor device

DESCRIPTION OF THE PREFERRED EMBODIMENTS

FIG. 1 shows a side view of the invention. With respect to figure one the invention includes a pair of elongated arms 1 and 2 composed of plastic or similar functioning material. Parallel ribs 14 on the inner surface of said arms create increased lateral strength and resist deformation of the arms when under pressure. Arms 1 and 2 are connected in a parallel position via an interlocking pivot shaft 3, creating mechanical advantage at jaws 11. Said jaws 11 utilize two rubber type pads 12 and 13 which firmly hold a fishing line in place.

The tension engaging surfaces 4 and 5 when pressed together create tension at jaws 11 utilizing the shaft 3 to create a fulcrum producing said tension. The ratchet receptor teeth 6 interlock with ratchet arm teeth 7 holding parallel arms 1 and 2 in sustained adjacent position maintaining continued tension at jaws 11. The salient tension release arms 9 and 10 when pressed together disengage the ratchet teeth 6 and 7 reducing tension at jaws 11.

A cable tether line 15 connects the invention to an outrigger or downrigger ball. The tether hook 16 secures said tether line to a fixed position on an outrigger or downrigger ball not shown.

FIG. 2 shows a two part interlocking shaft 3. A ribbed interlocking shaft 17 is press fitted into a receptor interlocking shaft 18 creating a permanent and inflexible shaft resistant to mechanical stress.

FIG. 3 shows a four position view of compression arms A and B. The compression arm outside view 19 shows the interlocking shaft hole 23 and circular pad depression 24. Compression arm inside view 20 shows the interlocking shaft hole 23 and circular depression 24 from the opposite side of arm view 19. Left compression arm view 21 shows the oval nature of circular pad depression 24 and the cubed nature of tether line anchor device 25 with a spherical passage projecting through the cube figure and parallel to the ratchet lever arm. Right compression arm 22 shows an inverted positioning from left compression arm 21.

OPERATION OF THE INVENTION

The adjustable line release can be used wherever a line release device is required. The most common use for the compression type release is in combination with downrigger fishing equipment. A fishing line and bait are allowed to trail behind a trolling boat. The adjustable line release is secured to the downrigger ball with a tether and hook. All tension is released from the friction jaws by compressing salient tension arms 9 and 10. The fishing line is then placed at the back most part of the friction jaws. Tension engaging surfaces 9 and 10 are then pressed into near parallel proximity causing said jaws to hold the fishing line in place.

When fishing large baits at high trolling speeds compression arms A and B should be placed into increasing parallel proximity. Light baits and slow speed require decreasing parallel proximity of the compression arms.

The downrigger weight and release device are then lowered below the surface to a desired depth. When a fish bites the bait the fishing line is pulled from the release allowing the fisherman to play his fish on a free and unencumbered line. The downrigger weight is then raised and the process repeated.

Thus, the reader will see the invention provides a fisherman with a line release device which: Can be used in various fishing applications, operates for differing fish species in both fresh and salt water, is corrosion free, does not chafe the fishing line, provides consistent performance, can be operated with one hand, and assures a wide range of tension adjustments, while jaw tension can be released or engaged by using only two fingers.

I claim:

1. A fishing line releasing device with adjustable line clamping force comprising:
   A) a pair of elongate body members, each having a jaw portion with a line-engaging face, an intermediate portion, and an extended arm portion with a free end;
   B) a shaft means for pivotally connecting said body members for pivoting about a pivot axis, said shaft means joining said body members together at the intermediate portions, whereby the jaw portions are positionable between an open position and a closed position in which the line-engaging faces are pressed together for releasably holding said line therebetween by an adjustable force applied by forcing the arm portions together;
   C) each said arm portion having an inner face adjacent a meeting plane, said meeting plane being normal to said pivot axis;
   D) each said arm portion including a first ratchet member supported on a projection of said arm portion extending from said inner face across said meeting plane, said ratchet member having first ratchet means extending therefrom and away from said axis;
   E) each said arm portion including a second ratchet member supported at said free end of said arm and having second ratchet means extending toward said axis;
   F) said second ratchet means of each said arm portion arranged to coact with said first ratchet means of the other arm portion, whereby a coacting pair of ratchet means are provided on each side of said meeting plane for maintaining by ratchet action progressively more tightly closed positions of said jaw portions by pressing said arm portions together.

2. The device according to claim 1, in which said second ratchet member is springably attached to said free end of said arm portion.

3. The device according to claim 2, in which a finger-engaging projection extends radially from each said second ratchet member and said second ratchet members are arranged so that pressing the finger-engaging projections together disengages both pairs of coacting ratchet means to thereby move said jaw portions to an open position.

4. The device according to claim 3, including a resilient element on each said line-engaging face of said jaw portion.

5. The device according to claim 4, including a plurality of ridges on said inner face for enhanced strength and rigidity.

6. The device according to claim 5, in which said shaft means includes a pair of interlocking members, each member having an expanded head.

* * * * *